Figure 1:
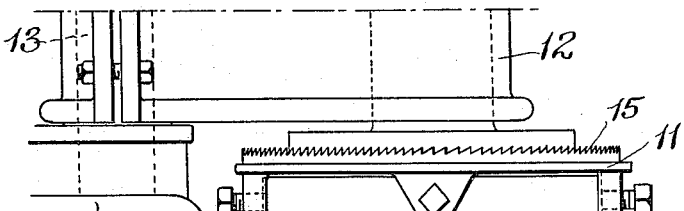

G. B. GROVER.
TRIMMER FOR DIEING MACHINES.
APPLICATION FILED MAY 7, 1914.

1,155,655.

Patented Oct. 5, 1915.

Witnesses:
J. F. Pezzetti
H. A. Rahn

Inventor:
George B. Grover
by Wight, Brown, Quimby & May
attys.

UNITED STATES PATENT OFFICE.

GEORGE B. GROVER, OF LYNN, MASSACHUSETTS, ASSIGNOR TO W. J. YOUNG MACHINERY COMPANY, OF LYNN, MASSACHUSETTS, A CORPORATION OF MASSACHUSETTS.

TRIMMER FOR DIEING-MACHINES.

1,155,655.

Specification of Letters Patent.

Patented Oct. 5, 1915.

Application filed May 7, 1914. Serial No. 836,957.

*To all whom it may concern:*

Be it known that I, GEORGE B. GROVER, a citizen of the United States, and resident of Lynn, in the county of Essex and State of Massachusetts, have invented certain new and useful Improvements in Trimmers for Dieing-Machines, of which the following is a specification.

The present invention relates to an attachment for machines which cut pieces from sheet material by the action of a die in coöperation with a cutting block, with the object of acting upon portions of the block adjacent to those portions against which the die acts, to equalize the wear upon the block over its entire surface.

The particular embodiment of my invention illustrated and described in this application is designed for use in connection with the cutting block of the dieing out machine illustrated in my patent No 1,063,871 dated June 3, 1913, to which reference is made in order to assist in explaining the present invention, but without any intention of limiting this invention to that machine alone. The machine shown in the patent referred to includes a die and a cutting block against which the edge of the die is pressed in cutting articles from sheet stock, such as leather, leather board, or like material, and the block is of a relatively soft material, preferably wood, in order not to dull the cutting edge of the die. The block is also turned slightly from time to time in order that the die will not act always at the same point on the surface of the block. The result which occurs in practice by reason of the comparatively soft nature of the block and of its progressive displacement with relation to the die is that after extended use the material of the block becomes cut away in the zone of its surface against which the die acts. The relation between the die and block is necessarily made such that the die acts within the periphery of the block in order to insure support of all points of the stock against which the cutting edge of the die is pressed, so that the extreme peripheral edge of the block is left intact while the surface within such edge is cut and chipped away, and a rib is left standing at the edge of the block. This rib has the objectionable effect of holding the sheet of stock somewhat away from the supporting surface of the block, making difficult the cutting of articles by the die in the proper manner and of exactly the right size and shape.

The object of my present invention is to provide a cutter or trimmer acting in conjunction with the die for cutting and wearing away the peripheral part of the block at the same time that the surface inside of this peripheral part is cut and worn away by the die, to secure the effect of having the work opposing surface of the block approximately smooth and plane at all times.

In the accompanying drawings I have illustrated so much of the machine referred to as will enable my present invention to be understood.

Figure 2:
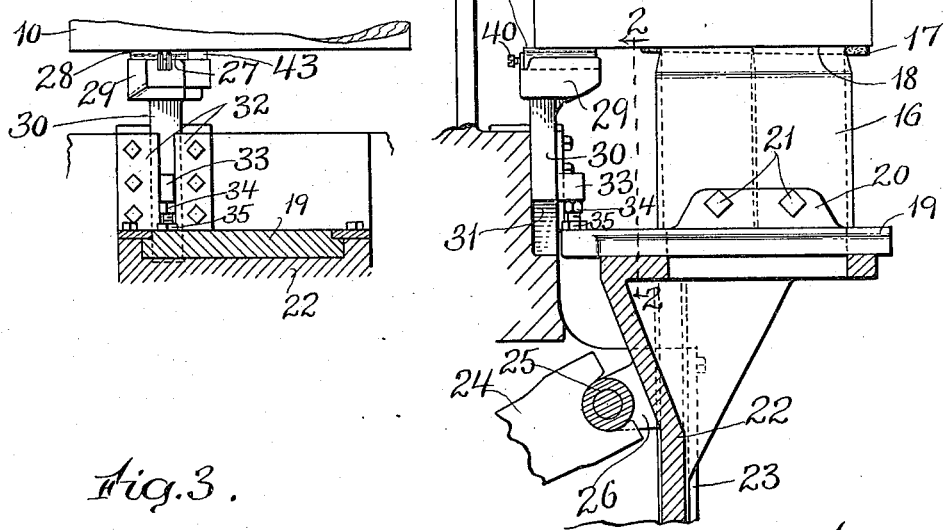
Figure 3:
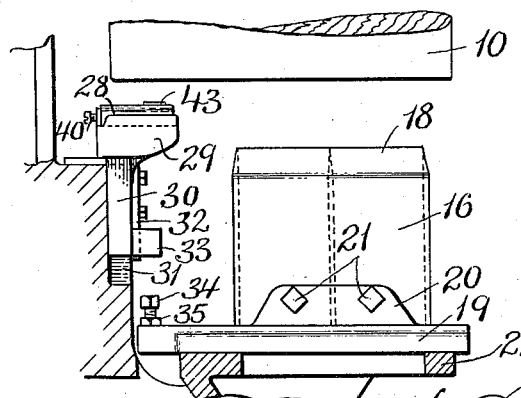
Figure 4:
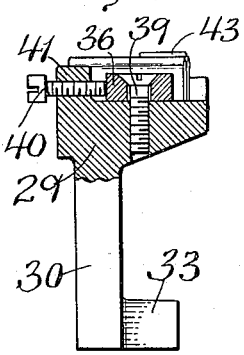
Figures 5, 6:
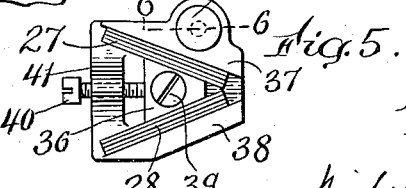

Figure 1 of the drawings is an elevation of the cutting block and die, parts of the frame of the machine and of the holder for the die being also shown. Fig. 2 is a sectional elevation of the parts at the left of the line 2—2 of Fig. 1. Fig. 3 is a partial elevation of the cutting block and die showing the die separated from the block. Fig. 4 is an elevation and partial section of the knife carrier and knives which form the present embodiment of my invention. Fig. 5 is a plan view of the trimmer embodying my invention. Fig. 6 is a section detail view of an adjunct of the trimmer, taken on line 6—6 of Fig. 5.

The same reference characters indicate the same parts in all the figures.

In the drawings, 10 represents a cutting block, which may be considered as made of wood, or of some other material so much softer than steel that it will be indented by the sharp cutting edge of a die without appreciably blunting such edge. Said block is secured in a holder 11 mounted rotatably in an arm 12 which is adjustably secured to a post 13 rising from the frame 14 of the machine, conveniently in the same manner as illustrated in my patent above referred to. The holder 11 is provided with ratchet teeth 15 by which the holder and block may be turned progressively through small angles to present continually a fresh surface to receive the thrust of the die. For illustration of a suitable means for thus rotating the block, attention is directed to my patent aforesaid.

A cutting die is represented at 16, this particular die being so formed as to cut two heel lifts at one stroke from sheet stock 17 interposed between the block and the edge of the die. 18 represents the sharpened cutting edge of the die. The die is mounted upon a base or holder 19 between flanges 20 on such holder, and is secured by clamping screws 21 held in such flanges. The die holder is mounted upon a carrier 22 which reciprocates in a guideway 23 toward and away from the block 10 and is so reciprocated by an arm or lever 24 having a notch which is occupied by a roll 25 on a bracket 26 of the die holder. The die may be secured to the die holder and the latter to the carriage, and the carriage may be reciprocated, by the means illustrated in my patent above referred to or by any other suitable means.

The trimmer in which my present invention is embodied consists of knives 27, 28 and a knife holder to which said knives are secured. The knife holder has a shank 30 formed as a slide arranged to travel in a guideway 31 formed as a part of the machine frame below the cutting block, and in which it is retained by overlapping retaining plates 32. The shank or slide 30 has a foot 33 overlying a part of the die holder, and the latter carries an adjustable stud 34 beneath said foot adapted to engage the foot when the die is moved toward the block, whereby to move the trimmer also toward the block. Stud 34 is preferably a screw threaded into and adapted to enter a hole in the die holder provided with a locking nut 35. Thereby the extent of the projection of the stud from the die holder may be regulated in order to bring the edges of the trimmer knives into the same plane with the edge of the die when the latter encounters the cutting block; or in other words to cause the trimmer knives to indent the block to the same extent as the die.

The trimmer is so positioned that the knives 27 and 28 cross the edge of the block, while the die is located so that all points in its cutting edge are within the peripheral portion of the block. Also the knives 27 and 28 are inclined to one another for the purpose of causing the indentations made by one knife to cross the indentations made by the other, thereby cutting the part of the block on which they act into small diamond shaped particles which readily break off and fall away. Preferably there are two knives 27 and two knives 28, although there may be only one or more than two of each, if desired. The knives are set in a V-shaped notch in the upper end of the holder, as appears clearly from Fig. 5, and are secured in such notch by a wedge block 36 which presses the knives against the ribs 37, 38, respectively, which form the boundaries of the notch. The wedge block is held in place by a screw 39 passing into the holder through a hole in the block, such hole being enough larger than the screw, as appears from Fig. 4, to permit enough movement of the block to clamp the knives securely. Pressure is applied to the block for so clamping the knives by a screw 40 which is threaded through a lug 41 on the knife holder and bears against the large end of the wedge block. The screw 40 may be termed for the purpose of description the clamp actuator.

The knife holder is provided with a socket 42 in which is contained a plunger 43 and a spring 44, the latter bearing against the head of the plunger and reacting against the bottom of the socket. The plunger has a shank 45 around which the spring is coiled, and such shank passes through the bottom of the socket and contains a retaining pin 46 to prevent the plunger from jumping out of the socket. The purpose of the plunger is to withdraw the trimming knives from the block when the die recedes, for the engagement between the die holder and the trimmer is positive only in one direction, namely the direction of approach toward the block, and the knives might stick in the block if some means such as the plunger or an equivalent device were not provided to withdraw the trimmer.

It is to be readily understood that each stroke of the die carrier which brings the die against the cutting block also forces the knives of the trimmer against the block and causes such knives to cut into the block to exactly the same extent as the die. Thus the trimmer chips away the edge of the block to the same extent that the surface of the block on which the die acts in the course of successive reciprocations and of the relative rotary displacement of the block is cut or chipped away. It follows, then, that no projecting rib is left at the edge of the block outside of the zone of action of the die, but that on the contrary the entire work supporting or abutting surface of the block is cut away to a uniform extent and is left in a sufficiently smooth condition and nearly enough flat to support the stock firmly and in the necessary manner at all points whereon the die acts. In other words the effect of the trimmer is to remove any projections which might otherwise have been left on the surface of the block which would have the effect of holding any part of the stock away from the surface toward which it is pressed by the die in cutting.

It is, of course, to be understood that I do not restrict my invention to a trimmer having the exact construction and arranged in precisely the manner here shown. It is within my contemplation to modify the trimmer in various ways and operate it by other means than here shown and adapt it for use in other types of machine. Essentially, the invention consists in a trimming device operated in conjunction with a die or equivalent cutting tool, to cut away the surface of a cutting block adjacent to the surface on which the die acts and to substantially the same extent that the surface of the block is cut away by the die. Considering the invention from this point of view, it is evident that the block could be either above or below the die or in any other relation and that the relative displacement between the die and block could be effected either by rotating the die step by step, as hereinbefore suggested, or by shifting the die. It is also evident that it would not be a departure from the invention to hold the trimmer fixed and use it in connection with a fixed die and in connection with a reciprocating cutting block.

What I claim and desire to secure by Letters Patent is:

1. In a dieing-out machine, the combination with a cutting block, of a cutting die, and a trimmer arranged to act simultaneously against the work-supporting surface of said block said trimmer being located to cut the parts of such surface which are not touched by the die.

2. The combination of a cutter and an opposed cutting block constituting coöperating cutting members relatively arranged for respectively severing material and supporting the material against the thrust of the cutter, one of said members being movable toward and from the other to effect the cutting operation, and one of said members being laterally movable with respect to the other to cause the indentations produced by the cutter in the surface of the block to be distributed over such surface, and a trimming cutter arranged and operated to indent a portion of the operative surface of the block adjacent to the portion or zone of such surface on which the cutter acts.

3. The combination in a dieing-out machine, of a cutting block, a sharp edged cutting die movable into contact with and away from a surface of the block, said block being movable step by step to present different portions of its surface to the edge of the die, whereby the indentations produced by the die are distributed over the surface of the block instead of being concentrated at one location, and means supplemental to the die for similarly indenting the surface of the block contiguous to the zone in which the indentations produced by the die are located.

4. In a dieing-out machine, the combination of a sharp edged cutting die and a cylindrical block arranged with one end opposed to the die, said die and block constituting coöperating opposed members for respectively cutting and supporting material, one of said members being displaceable laterally about the axis of the block, and means acting simultaneously with the die for indenting the surface of the block adjacent to that portion of such surface against which the die acts.

5. In a dieing-out machine, the combination of a relatively stationary cutting block, a die arranged to move toward and away from the end surface of the block and to be pressed against such surface, said block being laterally movable with respect to the die, an auxiliary sharp-edged cutter mounted for cutting movement in a path parallel to that of the die and arranged to engage a zone of the surface of the block beside the zone of such surface against which the die acts.

6. The combination of a cutting block having an operative surface at one end and mounted to rotate about an axis transverse to such surface, a cutting die reciprocatively mounted for movement toward and away from such surface and into contact with the surface, and a trimmer mounted for reciprocative cutting movement toward and into contact with the edge portion of the said surface of the block.

7. The combination of a cutting block having an operative surface at one end and mounted to rotate about an axis transverse to such surface, a cutting die reciprocatively mounted for movement toward and away from such surface and into contact with the surface, and a trimmer mounted for reciprocative cutting movement toward and into contact with the edge portion of the said surface of the block, said trimmer having a plurality of cutting edges disposed at an angle to one another.

8. The combintaion of a cutting block having a work supporting surface and being movable progressively through limited distances in approximately the plane of such surface, a die reciprocatively movable into contact with such surface and away from the same, located so as to engage the surface within the periphery thereof, and a trimming cutter reciprocatively movable in its cutting movements toward and from the said surface of the block and having a cutting edge crossing the peripheral part of such surface.

9. The combination of a cutting block having a work supporting surface and being movable progressively through limited distances in approximately the plane of such surface, a die reciprocatively movable into contact with such surface and away from the same, located so as to engage the surface within the periphery thereof, and a trimming cutter reciprocatively mounted toward and from the said surface of the block and having a cutting edge crossing the peripheral part of such surface, a means for causing said trimmer to bear on the block simultaneously with the action of the die and to indent the portion of the block's surface on which it bears to substantially the same extent that the block is indented by the die.

10. The combination with a cutting block and a die, of an auxiliary cutter located beside the die and arranged to act while the die remains in its operative location upon a portion of the surface of the block adjacent to the portion thereof with which the die coacts.

11. A cutting block trimmer for a dieing-out machine, comprising a holder, and edged cutting blades mounted upon said holder, the holder being constructed to secure said blades with their edges in a plane parallel to the surface of the cutting block and making an oblique angle with one another in such plane, and being movable toward and away from the block in cutting, whereby its cutting effect is to indent the block.

12. A cutting block trimmer for a dieing-out machine, comprising a holder having a V-shaped notch in one end, blades mounted in said notch arranged respectively in contact with the outer bounding walls of the notch, and a wedge clamp between said blades and so disposed as to press them firmly against the said bounding walls.

13. A trimming cutter of the character described, comprising a holder, divergent blades secured upon said holder having their operative edges in approximately the same plane, and a resilient presser mounted upon said holder and movable across such plane.

14. A trimming cutter of the character described, comprising a holder having a V-shaped recess and divergent walls forming the boundaries of such recess, cutting knives mounted in said recess in contact respectively with the opposite walls thereof, whereby said knives are obliquely disposed to one another a wedge block having opposite faces approximately parallel to the respectively adjacent walls of the recess located between the knives, and a clamping member arranged to exert pressure on said wedge block toward the narrow end of the recess.

15. In a dieing-out machine, the combination of a cutting block, a cutting die movable toward and away from the surface of said block, a trimmer mounted slidingly for movement in a path approximately parallel to that of the die, said trimmer including a knife, and said die and trimmer having interengaging portions arranged to cause approach of the trimmer to the block when the die approaches the block.

16. In a dieing-out machine, the combination of a cutting block, a cutting die movable toward and away from the surface of said block, a trimmer mounted slidingly for movement in a path approximately parallel to that of the die, said trimmer including a knife, and said die and trimmer having interengaging portions arranged to cause approach of the trimmer to the block when the die approaches the block, said portions including an adjustable element for regulating the extent of such approaching movement of the trimmer.

17. In a dieing-out machine, the combination of a cutting block, a die holder, a die mounted upon said holder and projecting toward the block, said holder and die being movable reciprocatively toward and from the block, an auxiliary trimmer slidingly mounted beside the die and movable approximately parallel with the die, said trimmer having indenting cutters on its end nearest the block arranged in a plane approximately parallel to the opposed surface of the block, and said trimmer having a foot extending between the die holder and the block, whereby said die holder is adapted to bear upon said foot in its approach to the block and move the trimmer toward the block.

18. In a dieing-out machine, the combination of a cutting block, a die holder, a die mounted upon said holder and projecting toward the block, said holder and die being movable reciprocatively toward and from the block, an auxiliary trimmer slidingly mounted beside the die and movable approximately parallel with the die, said trimmer having indenting cutters on its end nearest the block arranged in a plane approximately parallel to the opposed surface of the block, and said trimmer having a foot extending between the die holder and the block, and an abutment mounted on said die holder in position to engage said foot during the movement of approach of the die holder toward the block, said abutment being adjustable in the line of such movement whereby to regulate the extent of movement given to the trimmer.

19. In a dieing-out machine having a cutting block and a cutting die arranged to cut against a surface of the block, one of the elements constituted by said block and die being movable toward and away from the other in cutting, and one of said elements being also movable laterally with respect to the other to distribute the cutting effect, an auxiliary cutter or trimmer arranged for operation beside the die in position to act on parts of the said surface of the block which are not touched by the die, and means for operating said trimmer while the die is in operative relation to the cutter.

20. In a dieing-out machine, the combination with a cutting block and a cutting die mounted to move in a definite path toward and away from the block, of an edged trimmer also mounted to move in a definite path toward and away from the block and arranged to trim by indenting those parts of the block which are not indented by the die.

21. In a dieing-out machine, the combination with a cutting block and a cutting die, of an auxiliary trimmer, said die and trimmer being arranged to cut against the same surface of the block, and the trimmer being further arranged to cut those portions of the block which are not cut by the die, and means for causing the trimmer to act while the die is in action.

In testimony whereof I have affixed my signature, in presence of two witnesses.

GEORGE B. GROVER.

Witnesses:
H. Ashby Bowen,
Charles D. C. Moore.

Copies of this patent may be obtained for five cents each, by addressing the "Commissioner of Patents, Washington, D. C."